(12) United States Patent
Horvath et al.

(10) Patent No.: US 7,314,219 B1
(45) Date of Patent: Jan. 1, 2008

(54) SHAFT SEAL ASSEMBLY

(75) Inventors: Michael Jason Horvath, Toledo, OH (US); Frank James Bowler, Brighton, MI (US)

(73) Assignee: Torque-Traction Technologies, LLC., Maumee, OH (US)

( * ) Notice: Subject to any disclaimer, the term of this patent is extended or adjusted under 35 U.S.C. 154(b) by 60 days.

(21) Appl. No.: 11/030,880

(22) Filed: Jan. 10, 2005

(51) Int. Cl.
*F16J 15/32* (2006.01)
(52) U.S. Cl. ................................. 277/551; 277/572
(58) Field of Classification Search ............ 277/571, 277/572, 551
See application file for complete search history.

(56) References Cited

U.S. PATENT DOCUMENTS

| | | | | |
|---|---|---|---|---|
| 3,482,844 A | * | 12/1969 | McKinven, Jr. | ............ 277/349 |
| 3,682,488 A | | 8/1972 | Matsushima | |
| 3,685,841 A | | 8/1972 | Keller | |
| 4,428,586 A | * | 1/1984 | Romero | ...................... 277/565 |
| 4,448,426 A | * | 5/1984 | Jackowski et al. | ........... 277/353 |
| 4,936,591 A | * | 6/1990 | Romero | ...................... 277/551 |
| 5,129,744 A | * | 7/1992 | Otto et al. | ................... 384/486 |
| 5,183,269 A | * | 2/1993 | Black et al. | ................. 277/349 |
| 5,186,472 A | * | 2/1993 | Romero et al. | ............. 277/351 |
| 5,211,406 A | * | 5/1993 | Katzensteiner | ............... 277/351 |
| 5,269,536 A | * | 12/1993 | Matsushima et al. | ....... 277/349 |
| RE35,309 E | * | 8/1996 | Matsushima et al. | ........ 277/351 |
| 5,553,866 A | * | 9/1996 | Heinzen | ...................... 277/551 |
| 5,649,710 A | * | 7/1997 | Kanda | ......................... 277/371 |
| 6,308,677 B1 | * | 10/2001 | Bohach et al. | ........... 123/190.1 |
| 6,357,757 B1 | | 3/2002 | Hibbler et al. | |
| 6,464,228 B1 | * | 10/2002 | Oldenburg | .................. 277/309 |
| 6,637,754 B1 | | 10/2003 | Ohtsuki et al. | |
| 6,726,212 B2 | * | 4/2004 | Oldenburg | .................. 277/353 |
| 6,991,234 B2 | * | 1/2006 | Oldenburg | .................. 277/309 |

* cited by examiner

*Primary Examiner*—Patricia Engle
*Assistant Examiner*—Gilbert Lee
(74) *Attorney, Agent, or Firm*—Berenato, White & Stavish

(57) ABSTRACT

A seal assembly provides a seal between a housing member and a shaft member extending through a bore formed in the housing member. The seal assembly comprises a seal member mounted to the housing member within the bore and about the shaft member and extending radially inward therefrom, an axially extending seal sleeve member provided to fit over the shaft in a fluid-tight manner for cooperating with the seal sleeve member, and a guide member extending radially outward from the seal sleeve member. The guide member has geometry provided for centrally locating the shaft within the bore in the tubular housing. The guide member is provided to protect the sealing integrity of the seal member when the seal assembly and the shaft member are assembled to one another. A method for installing the seal assembly with the guide member is also provided.

14 Claims, 3 Drawing Sheets

SHAFT SEAL ASSEMBLY

BACKGROUND OF THE INVENTION

1. Field of the Invention

The present invention relates to shaft seals in general, and more particularly to a seal assembly having a wear sleeve and a shaft guide.

2. Description of the Prior Art

Seal assemblies, such as radial lip seals, are used in numerous rotating machine applications including wheel hubs, axle assemblies and anti-friction bearings, for providing a seal between relatively rotatable inner and outer members, such as a shaft and a wheel hub or axle housing disposed about the shaft, upon which elastomeric seal lips are sealingly sliding. The radial lip seals of this type are provided to both retain lubricant within the wheel hub or housing and to prevent dirt and other contaminants from entering therein. Known lubricant seal assemblies typically include an annular metallic outer case or can which is press-fit within a bore formed in the housing. An annular seal member formed from a resilient material and having a seal lip is mounted concentrically within the can. The shaft extends through the annular seal and is free to rotate therewith relative to the can.

The end of the axle shaft which extends through the radial lip seal typically includes a plurality of splines or teeth, which provide a degree of axial freedom within the axle assembly. The required bar size for the shaft to meet system requirements is generally such that a sealing surface diameter of the seal member is less than the major diameter of shaft splines. This assures that the spline teeth will come into contact with the sealing lips potentially cutting them and causing leaks. During the process of installing the radial lip seal and the axle shaft, the axle shaft is frequently inserted through the annular seal member. Assembly in this manner permits the splines of the axle shaft to directly contact the seal lip. As the splines of the axle shaft are frequently sharp or burred, such contact can damage the seal lip and compromise the sealing integrity of the radial lip seal.

Accordingly, it is the intent of this invention to overcome these shortcomings of the prior art, and more specifically, to protect the lips of the seal member during the assembly of the shaft and the seal assembly.

SUMMARY OF THE INVENTION

A seal assembly of the present invention provides a seal between a housing member and a shaft member extending through a bore formed in the housing member. The seal assembly comprises a seal member mounted to the housing member within the bore and about the shaft member and extending radially inward therefrom, an axially extending seal sleeve member provided to fit over the shaft in a fluid-tight manner for cooperating with the seal sleeve member, and a guide member extending radially outward from the seal sleeve member. The guide member has geometry provided for centrally locating the shaft within the bore in the tubular housing. The guide member is provided to protect the sealing integrity of the seal member when the seal assembly and the shaft member are assembled to one another.

A method for installing the seal assembly with the guide member comprises the following steps. First, the seal member, the seal sleeve member, and a guide member extending radially outward from the seal sleeve member are provided. Then, the seal member is mounted to the housing member within the bore therein, and the seal sleeve member along with the guide member is mounted to the shaft member. Subsequently, the shaft member with the seal sleeve member is axially displaced toward the seal member until the seal member sealingly engages the seal sleeve member.

The seal assembly and the method for installing thereof in accordance with the present invention provides a number of advantages over the current seal assemblies and methods for installing, including protection of the sealing integrity of a sealing lip of the seal member when the seal assembly and the shaft member are assembled to one another.

BRIEF DESCRIPTION OF THE DRAWINGS

Other objects and advantages of the invention will become apparent from a study of the following specification when viewed in light of the accompanying drawings, wherein.

DETAILED DESCRIPTION OF PREFERRED EMBODIMENTS

The preferred embodiment of the present invention will now be described with the reference to accompanying drawings.

Figure 1:
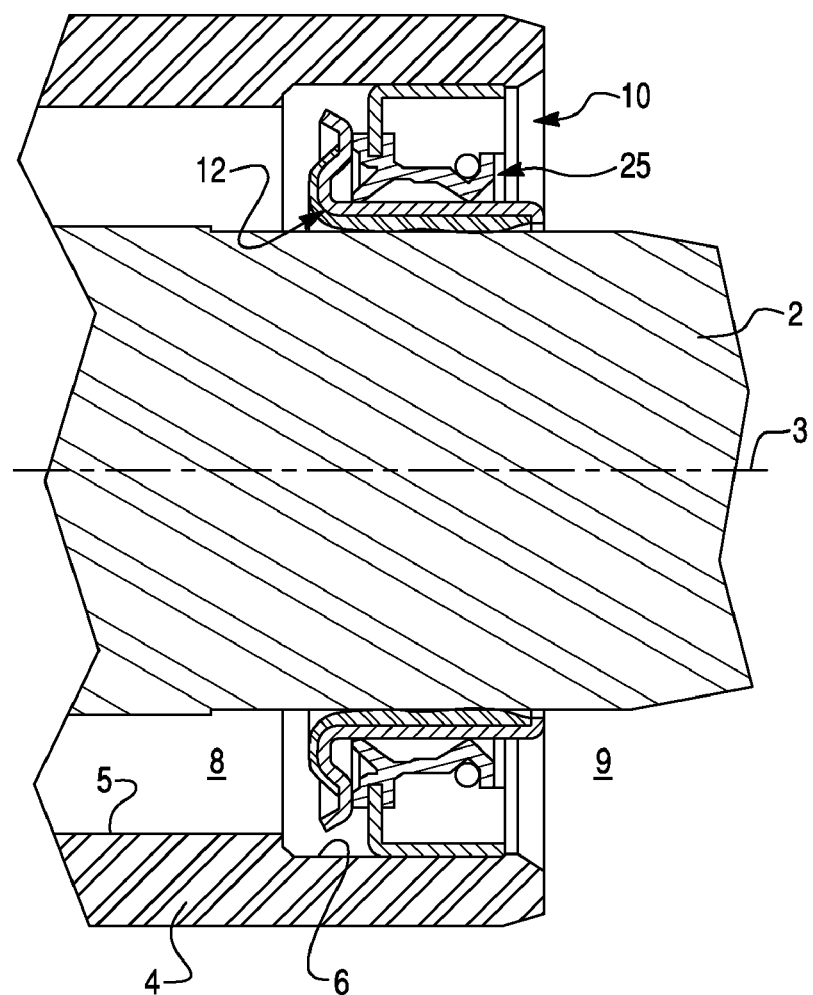
FIG. 1 is a cross-sectional view of a seal assembly providing a seal between a housing member and a shaft member in accordance with a preferred embodiment of the present invention.
Figure 2:
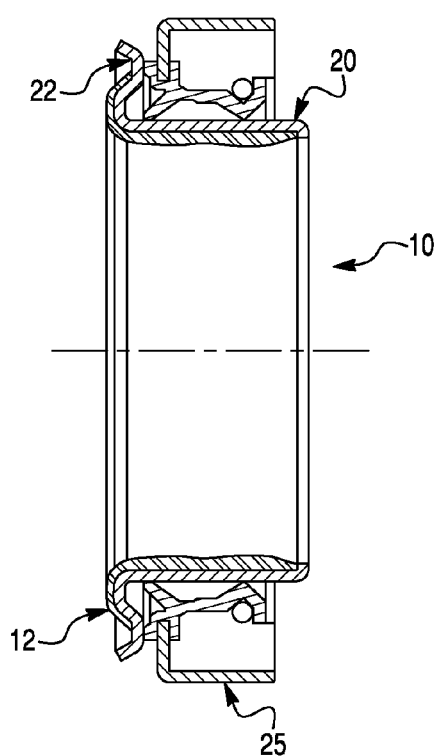
FIG. 2 is a cross-sectional view of the seal assembly in accordance with the preferred embodiment of the present invention in a free state when the seal assembly is disengaged from the mating housing and shaft members.
Figure 3:
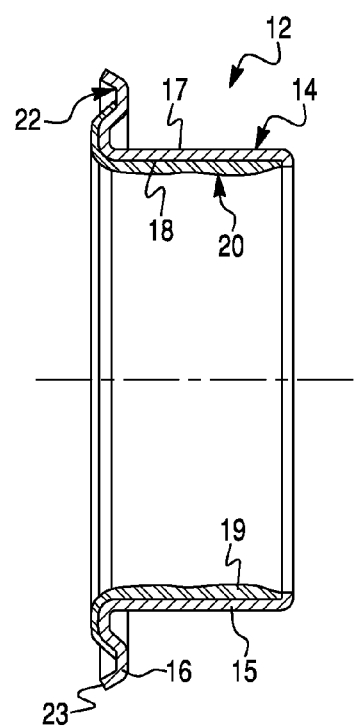
FIG. 3 is a cross-sectional view of an integrated seal/guide member in accordance with the preferred embodiment of the present invention in a free state when the seal/guide member is disengaged from the mating shaft member.
Figure 4:
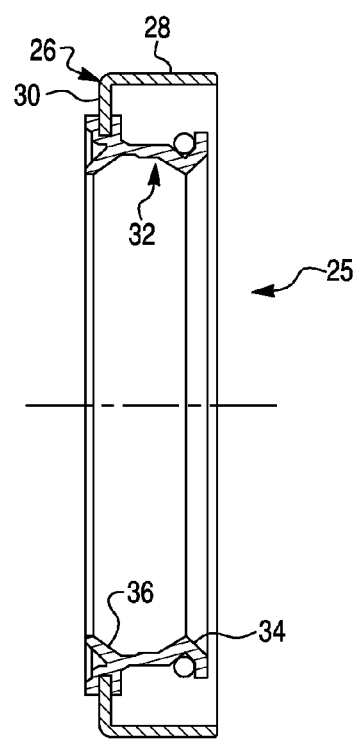
FIG. 4 is a cross-sectional view of a seal member in accordance with the preferred embodiment of the present invention.

FIG. 1 schematically depicts a unitized seal assembly, generally designated by the reference numeral 10, and includes an integrated seal/guide member 12 and a seal member 25 which are coupled together.

The unitized seal assembly 10 is intended to seal a fixed or rotary shaft member, such as an axle shaft 2 of a vehicle (not shown), with respect to a housing member, such as an axle tube 4 of an axle housing. As illustrated in FIG. 1, in an assembled position, the shaft member 2 extends through a bore 5 formed in the tubular housing 4. Both the shaft member 2 and the housing member 4 are coaxial to a central axis 3. According to the terminology commonly used in the art, the sealed region 8 within the housing member 4 will be referred to as the "oil side" and the opposite region 9 outside the housing member 4 as the "air side". It will be appreciated that any appropriate type of sealing application of the seal assembly of the present invention between a housing member and a shaft member is within the scope of the present invention.

As illustrated in FIG. 1, the seal/guide member 12 is mounted to an outer peripheral surface 4 of the axle shaft 2, while the seal member 25 is mounted to an inner peripheral surface 6 of the housing member 4.

In turn, the seal/guide member 12 includes an inner casing 14 and an elastomeric mounting portion 19 bonded to a radially inner peripheral surface 18 of the inner casing 14 for frictionally securing and fitting the seal/guide member 12 over the shaft member 2 in a fluid-tight manner. Moreover, the inner casing 14 includes a tubular seal sleeve section 15 and a shaft guide section 16 defined in the form of a flange extending radially outwardly from an axially inner end of the seal sleeve section 15. The term "axially inner" or "axially inwardly" as used herein is intended to mean the direction toward the oil side 8 of the seal assembly 10. Conversely, the term "axially outer" or "axially outwardly" means the direction toward the air side 9 of the seal assembly 10. The shaft guide section 16 has an outer tip 23 at a radially distal end thereof.

Preferably, the inner casing 14 is made by stamping of a sheet metal blank as a one-piece part. It will be appreciated that the inner casing 14 can be made of any other appropriate material and/or method of fabricating. For example, the inner casing 14 can be manufactured by separately forming the seal sleeve section 15 and the shaft guide section 16, then securing them together, such as by welding or bonding.

The seal sleeve section 15 has a polished outer peripheral surface 17 serving as a seal surface with which sealing lips of the seal member 25, described later, are sealingly engaged.

An important purpose of the seal sleeve section 15 is to provide controlled seal surface characteristics (finish, coatings, corrosion resistance) in addition to the wear function. The seal sleeve section 15 could be made of stainless steels or other alternative materials which provide resistance to corrosion and have a surface finish appropriate to lip seal contact. Also, the outer peripheral surface 17 of the seal sleeve section 15 of the inner casing 14 may be coated with various coatings such as polytetrafluoroethylene (PTFE), nylon (e.g. Glidecote®), luberize, chrome, etc. which can change the surface characteristics to reduce friction and/or surface discontinuities which degrade seal performance. Alternative embodiment would be to use a magnetically attractive substrate such as mild steel in the seal sleeve section 15 and a rubber seal compound having a residual magnetic property in the seal member 25 to maintain intimate seal lip contact with the substrate. Also conceivable would be the inverse with the magnetic portion on the seal sleeve section 15 and the rubber having a metal ring molded in place.

The shaft guide section 16 has geometry provided for positively centrally locating the shaft member 2 within the bore 5 in said housing member 4 beyond the engagement of shaft splines to mating component in order to protect lips of the seal member 25 during the assembly of the shaft member 2 and the seal assembly 10. More specifically, an outer diameter of the outer tip 23 of the shaft guide section 16 is slightly smaller than an inner diameter of the bore 5 of the housing member 4 so that the seal/guide member 12 is movable within the bore 5 while at the same time centering the shaft member 2 within the bore 5.

Therefore, the seal sleeve section 15 and the elastomeric mounting portion 19 form a seal sleeve member 20 frictionally secured to the shaft member 2 in a fluid-tight manner and provided for sealing cooperation with the seal member 25. The seal sleeve member 20 protects the seal lips of the seal member 25 and minimizes the need for finishing the outer peripheral surface of the shaft member 2. Similarly, the shaft guide section 16 forms a shaft guide member 22 extending radially outward from the seal sleeve member for protecting lips of the seal member 25 during the assembly of the shaft member 2 and the seal assembly 10.

Preferably, the elastomeric mounting portion 19 is made of synthetic rubber or the like and is bonded to the radially inner peripheral surface 18 of the inner casing 14. The elastomeric mounting portion 19 also prevents the shaft member 2 from being damaged as the seal sleeve member 20 is press fit thereover and to provide a fluid tight seal between the shaft member 2 and the seal/guide member 12.

Preferably, the seal member 25 is in the form of a radial lip seal and includes an outer seal casing 26 made by stamping of a sheet metal blank. In the illustrated embodiment, the outer seal casing 26 has a tubular mounting section 28 and a radial flange 30 extending radially inwardly from the mounting section 28 of the outer seal casing 26. In an assembled condition, the mounting section 28 of the seal casing 26 is press fit within a counterbore 6 formed in a distal end 4a of the housing member 4.

An elastomeric annular seal element 32 is bonded or molded to a distal end of the radial flange 30 of the outer seal casing 26 so as to cover and encapsulate the distal end of the radial flange 30. The seal element 32 is formed with a primary sealing lip 34 sealingly engaging and sliding against the outer peripheral surface 17 of the seal sleeve section 15 of the seal/guide member 12, i.e. the seal sleeve member 20. The primary sealing lip 34 may be biased against the surface 17 of the seal sleeve section with a garter spring 38 in a conventional fashion. Alternatively, no garter spring is employed to urge the primary sealing lip 34 into sealing contact with the seal sleeve member 20. Instead, the primary sealing lip 34 is brought into contact with the seal sleeve member 20 solely by the flexibility thereof. If desired, a secondary sealing lip 36 may be formed on seal element 32 for excluding dirt and debris from access to primary sealing lip 34.

Figure 5A:
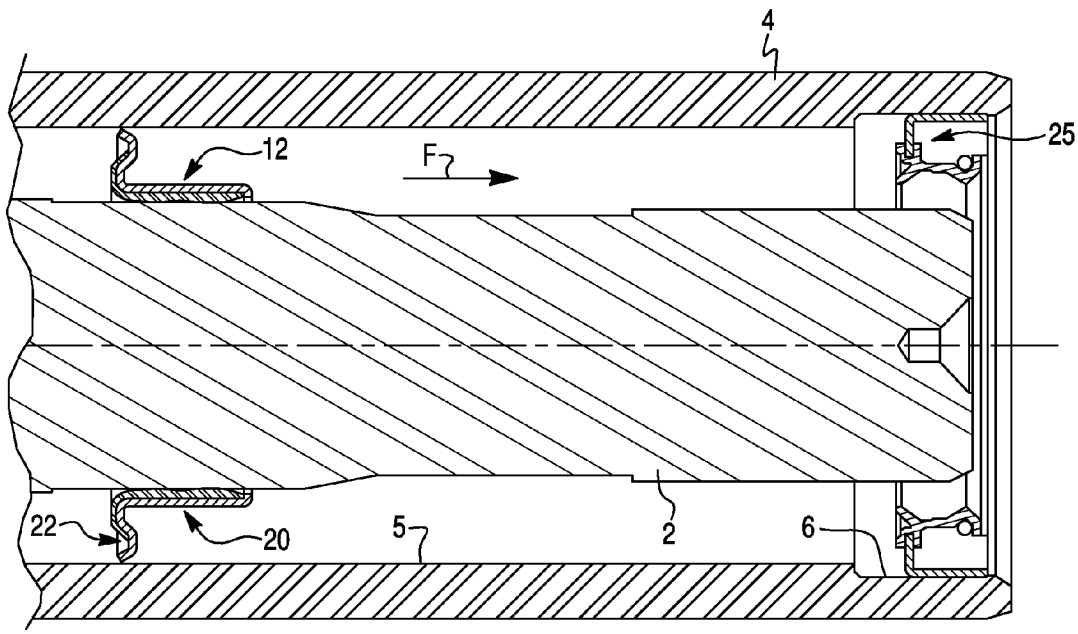
FIGS. 5A-5C shows the installation sequence of the seal assembly in accordance with a method of the present invention.
Figure 5B:
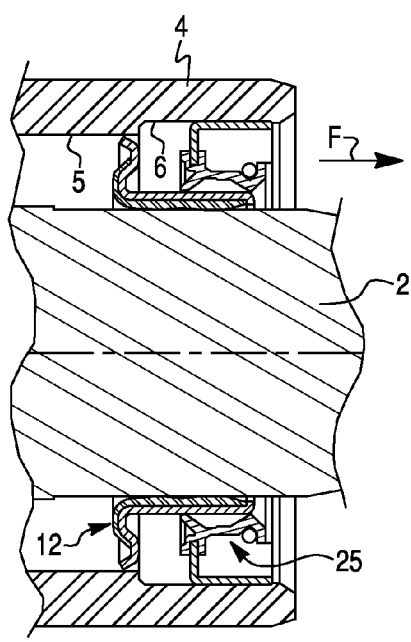
Figure 5C:
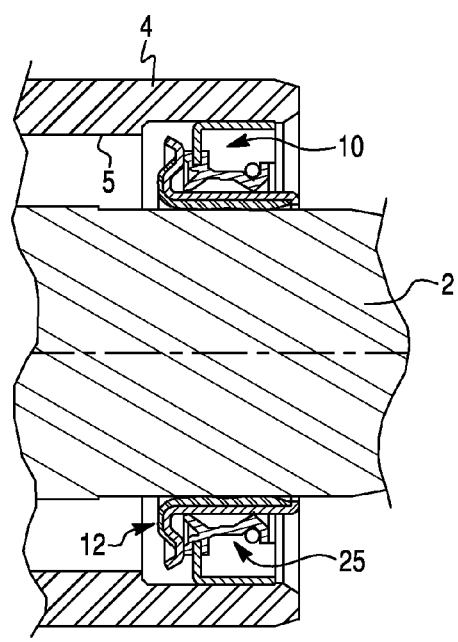

The installation of the seal assembly 10 is illustrated in FIGS. 5A-5C. During the assembling of the seal assembly 10, first the seal sleeve member 20 of the seal/guide member 12 is press-fit over the shaft member 2, while the mounting section 28 of the seal member 25 is press-fit into the counterbore 6 in the distal end 4a of the housing member 4, as illustrated in FIG. 5A. As seen in FIG. 5A, the sealing lips 34 and 36 of the seal element 32 of the annular seal member 25 are radially spaced from an outer peripheral surface of the shaft member 2.

Then, the shaft member 2 is inserted through the bore 5 in the housing member and the annular seal member 25 and displaced in the direction of an arrow F toward the annular seal member 25 until the seal sleeve member 20 sealingly engages the primary and secondary sealing lips 34 and 36 of the seal element 32 of the annular seal member 25, as illustrated in FIGS. 5B and 5C. While moving the shaft member 2 toward the annular seal member 25, the shaft guide member 22 centrally locates the shaft member 2 within the bore 5 in the tubular housing member 4 such that the annular seal member 25 is positioned concentrically to the seal sleeve member 20 of the seal/guide member 12. As a result, the sealing lips 34 and 36 of the seal element 32 of the annular seal member 25 are radially spaced from an outer peripheral surface of the shaft member 2, as seen in FIGS. 5A and 5B, to prevent direct contact between the sealing lips 34 and 36 of the seal element 32 and the shaft member 2. Consequently, the sealing integrity of the sealing lips 34 and 36 of the seal element 32 is protected when the seal assembly 10 and the shaft member 2 are assembled to one another. More specifically, the shaft guide member 22 of the seal/guide member 12 protects the seal element 32 of the annular seal member 25 against damaging contact with the shaft member 2, e.g. with splines of the shaft member 2.

Therefore, the present invention embodies a novel arrangement of a seal assembly and a method for installing the seal assembly between a housing member and a shaft member extending through a bore formed in the housing member, that is adapted to protect the sealing integrity of a seal lip when the seal assembly and the shaft member are assembled to one another.

The foregoing description of the preferred embodiments of the present invention has been presented for the purpose of illustration in accordance with the provisions of the Patent Statutes. It is not intended to be exhaustive or to limit the invention to the precise forms disclosed. Obvious modifications or variations are possible in light of the above teachings.

The embodiments disclosed hereinabove were chosen in order to best illustrate the principles of the present invention and its practical application to thereby enable those of ordinary skill in the art to best utilize the invention in various embodiments and with various modifications as are suited to the particular use contemplated, as long as the principles described herein are followed. Thus, changes can be made in the above-described invention without departing from the intent and scope thereof. It is also intended that the scope of the present invention be defined by the claims appended thereto.

What is claimed is:

1. A seal assembly for providing a seal between a housing member and a shaft member extending through a bore formed in said housing member, said seal assembly comprising:
    a seal member mounted to said housing member within said bore and about said shaft member and extending radially inward therefrom;
    an axially extending seal sleeve member provided to fit over said shaft in a fluid-tight manner, said seal member sealingly engaging said seal sleeve member; and
    a guide member extending radially outward from said seal sleeve member, said guide member substantially centrally locating said shaft member within said bore in said housing member such that said seal member being positioned substantially concentrically to said seal sleeve member by engaging an inner peripheral surface of said bore substantially along an entire periphery thereof so as to prevent direct contact between said seal member and said shaft member during assembling of said seal assembly.

2. The seal assembly as defined in claim 1, wherein said seal member is press-fit into said bore in said housing member.

3. The seal assembly as defined in claim 1, wherein said seal sleeve member is press-fit over said shaft member.

4. The seal assembly as defined in claim 1, wherein said guide member is formed integrally with said seal sleeve member as an integrated seal/guide member.

5. The seal assembly as defined in claim 4, wherein said integrated seal/guide member includes an inner casing and an elastomeric mounting portion bonded to a radially inner peripheral surface of said inner casing for frictionally securing and fitting said seal/guide member over said shaft member in a fluid-tight manner.

6. The seal assembly as defined in claim 5, wherein said inner casing includes a tubular seal sleeve section and a shaft guide section extending radially outwardly from said seal sleeve section.

7. The seal assembly as defined in claim 6, wherein said inner casing is made by stamping of a sheet metal blank as a one-piece part.

8. The seal assembly as defined in claim 6, wherein an outer peripheral surface of said seal sleeve section of said inner casing is coated with a friction reducing coating.

9. The seal assembly as defined in claim 8, wherein said friction reducing coating is one of polytetrafluoroethylene, nylon, luberize and chrome.

10. The seal assembly as defined in claim 5, wherein said inner casing is made of a corrosion resistant material.

11. The seal assembly as defined in claim 1, wherein said seal member comprises an outer seal casing and an elastomeric seal element secured to said outer seal casing, said elastomeric seal element is in sealing contact with an outer peripheral surface of said seal sleeve member.

12. The seal assembly as defined in claim 11, wherein said outer seal casing includes a mounting section secured to said bore in said housing member and a radial flange extending radially inwardly from said mounting section of said outer seal casing, said elastomeric seal element is secured to a distal end of said radial flange of said outer seal casing so as to cover and encapsulate said distal end of said radial flange.

13. The seal assembly as defined in claim 1, wherein a distance between a distal end of said guide member and said bore in said housing member is substantially smaller than a distance between an outer peripheral surface of said seal sleeve member and said shaft member.

14. A seal assembly for providing a seal between a housing member and a shaft member extending through a bore formed in said housing member, said seal assembly comprising:
    a seal member mounted to said housing member within said bore and about said shaft member and extending radially inward therefrom;
    an axially extending seal sleeve member provided to fit over said shaft in a fluid-tight manner, said seal member sealingly engaging said seal sleeve member; and
    a guide member extending radially outward from said seal sleeve member, said guide member substantially centrally locating said shaft member within said bore in said housing member such that said seal member being positioned substantially concentrically to said seal sleeve member by engaging an inner peripheral surface of said bore substantially along an entire periphery thereof so as to prevent direct contact between said seal member and said shaft member during assembling of said seal assembly;
    wherein said guide member is formed integrally with said seal sleeve member as an integrated seal/guide member;
    wherein said integrated seal/guide member includes an inner casing and an elastomeric mounting portion bonded to a radially inner peripheral surface of said inner casing for frictionally securing and fitting said seal/guide member over said shaft member in a fluid-tight manner; and
    wherein said seal sleeve section of said inner casing is made of a magnetic material, and wherein an elastomeric seal element of said seal member is made of an elastomeric seal compound having a residual magnetic property to maintain intimate seal lip contact with an outer peripheral surface of said seal sleeve section.

* * * * *